Oct. 21, 1958  G. F. BAHR  2,856,752
APPARATUS FOR STRETCHING BEAD CHAINS
Filed Oct. 27, 1954  2 Sheets-Sheet 1
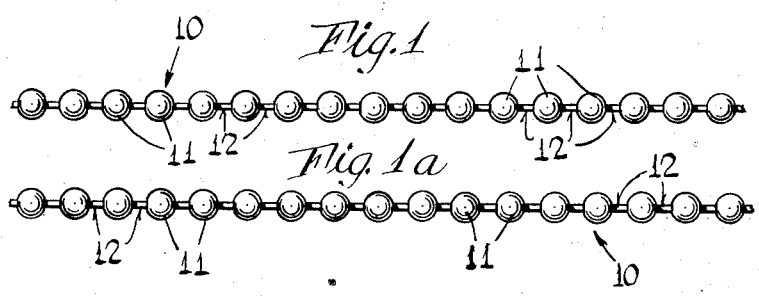
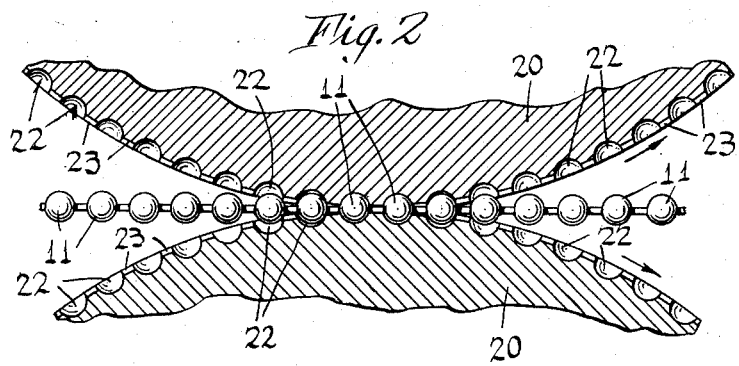
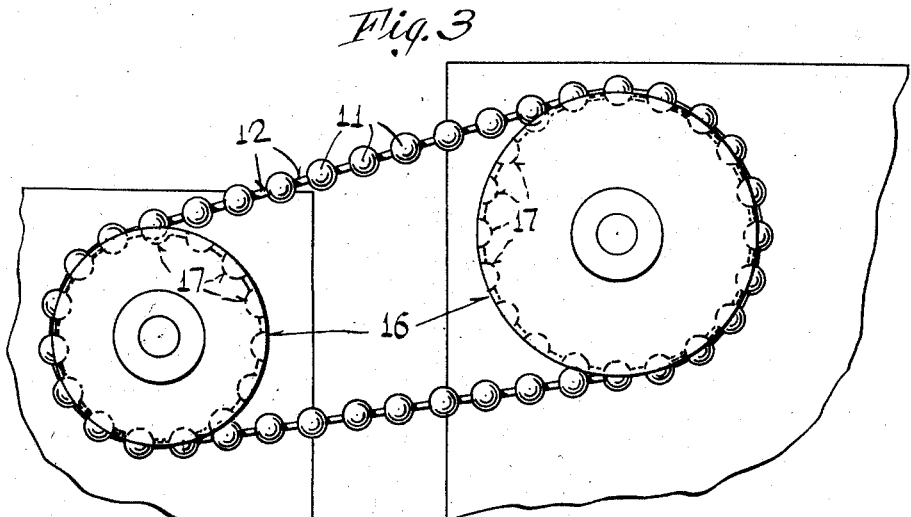
INVENTOR
Gustave F. Bahr
BY
Johnson and Kline
ATTORNEYS Oct. 21, 1958     G. F. BAHR     2,856,752
APPARATUS FOR STRETCHING BEAD CHAINS
Filed Oct. 27, 1954     2 Sheets-Sheet 2

INVENTOR
Gustave F. Bahr
BY Johnson and Kline
ATTORNEYS

United States Patent Office 2,856,752
Patented Oct. 21, 1958

2,856,752

APPARATUS FOR STRETCHING BEAD CHAINS

Gustave F. Bahr, Fairfield, Conn., assignor to The Bead Chain Manufacturing Company, Bridgeport, Conn., a corporation of Connecticut Application October 27, 1954, Serial No. 464,920

3 Claims. (Cl. 59—2)

This invention relates to driving chains and methods of, and apparatus for, making the same, and particularly to driving chains of the articulated ball and link type.

In the manufacture of ball and link type and other types of chains which are made by machinery in continuous lengths, variations occur, small in themselves, in chain produced on several machines of the same kind and in the materials from which the chain is made, with the result that the spacing between driving members of the chain lengths is not always uniform in the same chain length or equal to the spacing of the driving members in other chain lengths. As a result, the use of chain as a driving device has been restricted to situations where sufficient play or tolerance is permissible between the chain and the driving and driven sprockets to compensate for variations in the spacing of the driving members of a chain or a replacement therefor.

The use of chain as a driving device is extremely advantageous, since motion and power can be transmitted thereby positively, that is to say, without the danger of lost motion due to slipping; but, for reasons stated above, it has not been practical to employ chain as a driving device for precise relative movement between driving and driven members, as in the case of instrument control where a position indicator on the driving member must move in constant true angular coordination with the parts connected to the driven member.

An object of the present invention is to produce driving chain in which, notwithstanding the initial unavoidable variations in the spacing of the driving members thereof, the latter are predeterminately spaced in accordance with the spacing of the cooperating portions of the driving and driven members and to devise methods and apparatus whereby such a chain may be manufactured.

This is accomplished by initially making the chain so that when the chain is tautened there is less spacing between the driving members than the spacing of the portions of the driving and driven sprocket wheels with which the chain is to be used, and thereafter permanently elongating the chain to produce, when the chain is again tautened, determinate uniform spacing of adjacent driving members of the chain which is equal to the spacing of the driving portions of the sprocket wheels, the difference between said less spacing and said determinate spacing being within the limits of elongation of the chain. The elongation is preferably carried out by applying stretching forces seriatim to each successive pair of adjacent driving members, as by running the chain as initially made between rotary die members having driving-member-receiving portions separated by the same spacing as the corresponding members on driving and driven sprocket wheels. Where the difference between the initial spacing of the driving members and the desired spacing is too much to elongate the chain in one pass through die members, it may be run through two or more pairs of die members to elongate the chain in steps to produce the desired ultimate spacing.

The invention is particularly advantageous in connection with ball and link type chains, in the manufacture of which burrs are unavoidably formed on the engaging portions of the interconnected balls and links and to an unpredictable extent. Thus, added to the variations in the spacing of the balls in the tautened chain arising from chain lengths made on several machines or from different batches of material, there is the additional difference in spacing of the balls by reason of irregularities such as the burrs above referred to. By making all of the chain to be used as driving chain so that, regardless of variations and irregularities, the spacing of adjacent balls in a tautened chain will be less than the predetermined spacing required to fit the cooperating members of a sprocket wheel, such chain lengths may be converted by a supplemental operation into precise chain having each pair of adjacent balls equispaced and spaced the determinate distance apart.

Other features and advantages will hereinafter appear.

In the accompanying drawings:

Figure 1 is a plan view of a length of chain showing it as it is ordinarily made on the chain making machine.

Fig. 1a is a similar view showing the chain after it has been elongated to produce the desired spacing between adjacent driving members.

Fig. 2 is a fragmentary sectional view of the cooperating die members by means of which the chain may be elongated to produce the desired spacing between driving members.

Fig. 3 is an elevation showing the chain of the present invention warped over a driving and driven sprocket.

Figure 4:
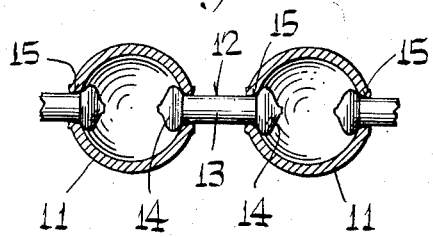
Fig. 4 is a sectional view of two adjacent balls and a connecting link of ball and link type chain.

The chain 10 as shown is made up of alternately placed ball members 11 and link members 12. The balls 11 are hollow metal spheres while the links 12 are dumbbell shaped, each having a shank 13 provided with a bulbous head 14 at each end. Each ball 11 encircles and connects the heads 14 of two adjacent links while the shanks 13 of the links extend freely through openings 15 in diametrically opposite sides of the ball, as shown in Fig. 4. The links and balls are movable axially relative to each other. They also swivel on each other over wide arcs in any direction in the manner of a universal joint and are free to rotate axially relatively. This makes the ball and link type chain desirable as a driving chain. since it may be bent around small radii and may have the direction of its course between driving and driven members altered to travel in diverse planes without the necessity of twisting the chain.

However, as pointed out above. where there is to be a positive drive between driving and driven members, as between sprocket wheels 16 shown in Fig. 3. reliance cannot be placed on the use of ball and link chain as heretofore commercially manufactured, due to uncontrollable variations in its manufacture, because there is no assurance that in a length of chain selected at random the balls will be uniformly and predeterminately spaced when the chain is tautened to fit the cooperating sockets 17 in the sprocket wheel even though in fabricating the chain such was the intention.

The causes for such variations in manufacture are many and unpredictable, as will appear below.

In the commercial manufacture of ball and link chain, a strip of sheet metal is swaged to form as a continuous element a continuous succession of link forms having adjacent heads joined by a frangible connection. Over the succession of link forms there is curled another strip of metal which is swaged to form as a continuous element a continuous succession of spherical forms, each surrounding two connected heads of link forms, with adjacent spherical forms joined by a frangible connection loosely surrounding the shanks of the adjacent links about midway their lengths. After this is done the whole, i. e. the connected spherical forms and encased link forms, are bent sharply over a cylinder, causing the frangible connections between the adjacent links and adjacent balls to be broken and permitting the heads of the links, when the chain is tautened, to move into contact with the concave surface of the balls 11 adjacent the openings through which the shanks of the links extend and by which the heads 14 are confined.

It can be appreciated that in breaking the frangible connections to produce the flexible articulated chain, the rupture will not always be the same, and therefore burrs can be expected to form on the balls at the places where they are engaged by the heads of the links and interfere with the proper engagement of those parts. The spacing between adjacent balls of a tautened chain would therefore vary from ball to ball, depending upon the absence of burrs or the presence and extent of the same.

Another variation in the spacing of the balls, it has been observed, may result from differences from batch to batch in the physical characteristics, such as the ductility and elasticity of the metal strips used to make the ball and link elements of the chain. The result is that at one time a machine may produce a tautened chain with $n$ number of balls per foot, while at another time, with different stock, the same machine would produce chain with $n+$ or $n-$ balls per foot in the tautened chain.

Another problem arises when the supply of chain, from which lengths of driving chains are to be made, includes chain made on several machines. Even though it is desired that the chain made on several machines be uniformly the same as to the spacing between balls and the number of balls in a unit length in a tautened chain, slight variations in the tooling of the several machines makes it impossible to rely upon the chains being so uniformly made on the several machines as to have utility as a driving chain.

When the chain is to be used for many other purposes, these variations are of no importance, except that in cutting the chain into predetermined lengths, if the number of balls per given length varies, the cutting tool instead of cutting the shank 13 of a link may be brought into engagement with a ball whose mass the cutter is not designed to sever.

It was observed that, although these variations are present in what may be termed "run-of-the-mill" ball and link chain and that they result in balls being spaced too close to nest in the sockets of a sprocket wheel so that the chain cannot properly operate as a driving chain, with careful manufacturing the range of variations can be such that the differences in spacing between the several adjacent balls fall within fairly definable limits not greatly in excess of the desired spacing.

Having made such observation, the present invention has solved the problem of providing a ball and link driving chain by making the chain initially so that the spacing of the balls is less than that required, when the chain is tautened, to fit the sockets 17 of a sprocket 16, Fig. 3 for instance, with which it is to be used, and as a second step to elongate the chain to produce the determinate tautened spacing of the balls, the difference between the less spacing and the determinate spacing being within the limits of elongation of the chain.

In the first step of this novel process, the swaging dies and other parts of the chain making machine may be so made as to produce chain in which the adjacent balls are spaced closer together than usually is the case for chain for general utility. However, the first step of the process may utilize existing chain making machines without alteration, the spacing of the balls being the usual spacing. In such case, the spacing of the sockets 17 in the sprocket wheel 16 would be made to fit the tautened chain after the second step in which it was elongated to the determinate spacing between balls.

The second step of the method of the present invention may be carried out by processing the chain, from which lengths of driving chain are to be cut, by die members having cooperating ball-receiving sockets predeterminately spaced to permanently elongate the chain by the forcing of the balls into the sockets.

Figure 5:
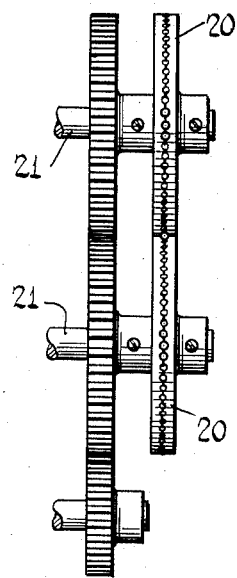
Fig. 5 is an elevation of the die members and their connecting gearing.

Apparatus for this purpose is shown in Figs. 2 and 5 in which a pair of cooperating disks 20 are mounted on parallel shafts 21 and are geared together for positive coordinate rotation under power. The peripheries of the disks 20 are provided with matching pairs of semicircular cavities 22 to receive the successive balls 11 of a chain. The cavities 22 are equispaced around the periphery of the disks and the spacing is the determinate space desired between adjacent balls of the chain. The peripheries of the disks may have arcuate clearance slots 23 to receive the links 12 when the cavities are substantially hemispherical and the peripheries of the disks substantially in contact.

The diameter of the disks is such that while one or more advance balls are in substantially closed cavities 22 of the disks the following ball is being forced into the next cavity by the closing thereof. This applies a stretching force to the chain on and between the two adjacent balls 11 and the link 12 connecting them, resulting in forcing the heads 14 of the link 12 against the concave inner surface of the ball and flattening or breaking off any burrs that may be resisting the nesting of the balls in the cavities. The relative movement of the link heads 14 and balls 11 in following the curvature of the periphery of the disk also contributes in the flattening or removal of burrs. The fact that burrs are removed in this operation is evidenced by the accumulation of small metal particles below and around the die members while they are in operation on the chain.

In instances where, for some reason or other, the determinate spacing of the adjacent balls is not otherwise produced by being run between the disks 20, it has been observed that the shanks 13 of the link 12 themselves have been elongated or stretched to produce the desired results, the stretch power of the die members being sufficient for this purpose.

Since the cavities 22 in the dies are substantially spherical, should it occur that a ball is malformed in the chain making machine so as to be slightly out of round, the forcing of the ball into the cavity formed between the dies when closed would swage the ball into proper shape.

In some instances, a single pass of the chain through the rotary die members may not be sufficient to stretch the chain to produce the desired spacing between adjacent balls so that they will fit the spacing of the sockets of the sprocket wheels with which they are to be used. In this case the stretching may be performed in two or more stages—one or more intermediate stages, doing part of the stretching, and the final stage, completing it with the die member having the cavities with the desired determinate spacing.

Figure 6:
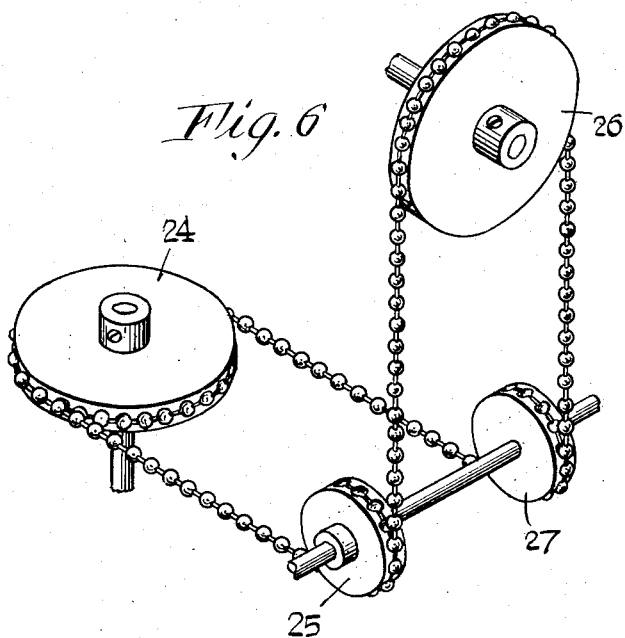
Fig. 6 is a perspective view showing the various angular planes in which the chain of the present invention may be coursed.

It has been found that the elongation of the chain not only produces a chain of uniform determinate ball-spacing, but the chain is more flexible and more freely articulated because the obstruction and burrs which are present in "run-of-the-mill" chain have been removed during the elongation of the chain, thereby permitting improved swiveling of the balls and links about each other. The flexibility of the chain thus achieved is particularly advantageous when the chain is a driving belt in pulley system as shown in Fig. 6 wherein the pulleys 24 to 27 inclusive are at various angles with respect to each other and the chain must be capable of conforming to the change in angularity of its various stretches. It is to be particularly noted that the courses of driving chain may be in different angularly intersecting planes without twisting the chain, thereby making it possible to readily determine beforehand the length of chain necessary by simply measuring the distances because there is no shortening of the length of chain as when belting or the like is used.

Since, in the chain of the present invention, the space between each pair of adjacent balls is predetermined and equal, there will be the same number of balls between each foot or other unit of length throughout the continuous chain and the chain may be cut into predetermined lengths, without the difficulty above referred to, each tautened length having the same linear dimension and the same number of balls.

When the driving chain is to be used in a closed continuous sprocket drive, for example as shown in Fig. 3, after the chain has been cut into its determinate length, the bulbous heads 14 on the ends of the terminal links are exposed, and thereafter united by means of another driving ball enclosing the same in any known manner.

By way of example, a length of chain before and after it is elongated is shown in Figs. 1 and 1a respectively.

Variations and modifications may be made within the scope of the claims and portions of the improvements may be used without others.

I claim:

1. The method of manufacturing a ball and link driving chain having balls articulately interconnected by and to links having bulbous heads confined within the balls, and having determinate tautened spacing between adjacent balls to fit predeterminately spaced cooperating ball sockets of driving and driven sprocket wheels, which includes a first step of making the chain with ball and link components of such dimensions that the chain will have initial spacing between tautened adjacent articulated balls less than said determinate spacing; and as a second step running the chain uninterruptedly between rotating die members having cooperating ball-rceiving sockets predeterminately spaced a distance apart greater than the initial spacing between the balls for permanently and individually stretching each pair of ball and link components of the chain and thereby elongate the chain to produce said determinate tautened spacing between the adjacent balls, the difference between said initial spacing and said determinate spacing being within the limits of elongation of the chain.

2. Apparatus for producing a driving chain having driving balls articulately connected by and to links in which the balls, when the chain is tautened, are equispaced with the space between each two adjacent driving balls having a predetermined value, comprising a pair of rotary die members between which is run a continuous length of chain having the spacing of adjacent driving balls less than said predetermined value, said die members having on their juxtaposed peripheries cooperating recesses, the latter on each member being equispaced with the space between each two adjacent recesses having said predetermined value; and means for connecting and driving the two rotary die members in coordination whereby the recesses therein are brought together in axial alignment to form a ball-receiving cavity, the diameters of said rotary die members being such that at least one cavity substantially confines within it one of a pair of adjacent balls while a succeeding cavity is closing on the other ball of said pair to apply a stretching force to the latter and the cavity confined ball to increase the space between said adjacent pair of balls to said predetermined value.

3. Apparatus as defined in claim 2, in which the cooperating recesses in the rotary die members are substantially hemispherical and the peripheries of the rotary die members are provided with clearance channels between said recesses to receive the links connecting the balls.

References Cited in the file of this patent

UNITED STATES PATENTS

| | | |
|---|---|---|
| 1,086,839 | Morse | Feb. 10, 1914 |
| 1,087,876 | Goodridge | Feb. 17, 1914 |
| 1,169,610 | Bradley | Jan. 25, 1916 |
| 1,205,233 | McCrudden | Nov. 21, 1916 |
| 1,255,912 | Morse | Feb. 12, 1918 |
| 1,258,472 | Schneider | Mar. 5, 1918 |
| 1,327,925 | Schneider | Jan. 13, 1920 |
| 1,548,677 | Goodridge | Aug. 4, 1925 |

FOREIGN PATENTS

| | | |
|---|---|---|
| 638,628 | France | May 30, 1928 |

OTHER REFERENCES

Bead Chain Manufacturing Co. publication, Bridgeport 5, Conn.; page 3, dated Feb. 9, 1953.